United States Patent [19]
Stewart

[11] 3,791,464
[45] Feb. 12, 1974

[54] AUGER DRILL AND CONVEYOR

[76] Inventor: Felix I. Stewart, 1309 O'Shaughnessey Ave., Huntsville, Ala. 35801

[22] Filed: Mar. 26, 1973

[21] Appl. No.: 344,503

[52] U.S. Cl. .................... 175/88, 175/172, 175/310
[51] Int. Cl. .............................................. E21b 3/02
[58] Field of Search ...... 175/88, 172, 207, 310, 323

[56] References Cited
UNITED STATES PATENTS

| 476,475 | 6/1892 | Morgan | 175/88 X |
| 556,349 | 3/1896 | Herza | 175/172 |
| 947,952 | 2/1910 | Sutherland | 175/172 |
| 1,154,137 | 9/1915 | Sletten et al. | 175/88 X |
| 1,191,992 | 7/1916 | Peters | 175/88 |
| 1,220,527 | 3/1917 | Martin | 175/88 |
| 1,600,681 | 9/1926 | Lodell | 175/172 X |
| 3,240,513 | 3/1966 | Turzillo | 175/323 UX |
| 3,747,697 | 7/1973 | Russell | 175/88 |

Primary Examiner—David H. Brown
Attorney, Agent, or Firm—Harvey B. Jacobson

[57] ABSTRACT

A drill for earth boring incorporating an auger combined with a bucket-type elevator or conveyor associated in such a manner that rotation of the auger and downward movement in a vertical direction will bore a hole into the earth with the soil being escavated by the conveyor thereby facilitating continuous boring of a hole without requiring that the auger be periodically removed from the bore hole and cleaned by high speed rotation.

8 Claims, 4 Drawing Figures

PATENTED FEB 12 1974 3,791,464

AUGER DRILL AND CONVEYOR

BACKGROUND OF THE INVENTION

1. Field of the Invention

The present invention generally relates to a combined auger drill and bucket-type elevator or conveyor associated therewith so that the auger drill will bore a hole and the bucket-type elevator or conveyor will convey the material from the auger up to the top of the bore hole for discharge into a removal vehicle or the like.

2. Description of the Prior Art

In forming a bore into the surface of the earth, it is not only necessary to remove the material at the bottom of a bore hole when forming a bore but this material must be conveyed to the earth surface. Various techniques have been developed for removing the material being drilled as the drill removes such materials. For example, in oil well drilling, it is common practice to flush the material out from the bore hole by the use of a drilling fluid that is conveyed down through the drill pipe and discharged at the drill bit to entrain the material being cut by the drill bit so that such material is conveyed back to the earth surface with the drilling fluid. Frequently, when holes of a relatively large diameter are being formed, a screw auger having several flights is mounted on the end of an elongated polygonal drill bar which is lowered through a driven rotary having an aperture therein corresponding to the drill bar so that the drill bar with the auger is rotated and vertical movement of the drill bar is accomplished by various mechanisms. In using such equipment, it has been the customary practice to lower the auger drill into the bore, rotate it a number of revolutions until the flight on the auger has been filled with dirt after which the auger is elevated to ground surface, swung to a position laterally of the bore hole and then rotated at a relatively high speed to clean the soil off of the auger at which time the operation is repeated. As will be apparent, this procedure, while successful, is quite inefficient since the time that is required to elevate the auger, swing it to one side, spin it, swing it back into a position aligned with the bore hole and lower it to the bottom of the bore hole represents wasted time in that the drilling operation is not being pursued at that time.

SUMMARY OF THE INVENTION

An object of the present invention is to provide an auger drill and conveyor that combines an auger drill at the lower end of an earth boring assembly and a bucket-type conveyor extending from the upper end of the auger drill to ground surface for discharge of soil at ground level as a continuous operation.

Another object of the invention is to provide an auger drill and conveyor in which the auger drill is tapered inwardly and upwardly and provided with a peripheral guide defining a shell for the auger which has its inner surface correspondingly tapered by which the material being removed by the auger drill is guided upwardly for engagement by the conveyor.

A further object of the invention is to provide an auger drill and conveyor in which the conveyor is driven by three peripherally arranged vertically disposed drive shafts which enable directional control of the auger drill to be attained by selective vertical movement of the shafts.

Still another object of the present invention is to provide an auger drill and conveyor in which the conveyor is in the form of a bucket-type elevator associated with the upper end of the auger drill in a manner to scoop up and convey the material upwardly thereby enabling continuous operation of the auger drill.

A still further object of the invention is to provide an auger drill and conveyor in which the device may be rapidly disassembled to enable access to be gained to the bore being drilled when desired and also to enable interpositioning of additional sections of the auger drill and conveyor to enable the bore to be formed at an indeterminate distance as may be required.

Another important object of the invention is to provide an auger drill and conveyor which is relatively simple in construction, efficient in operation and well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
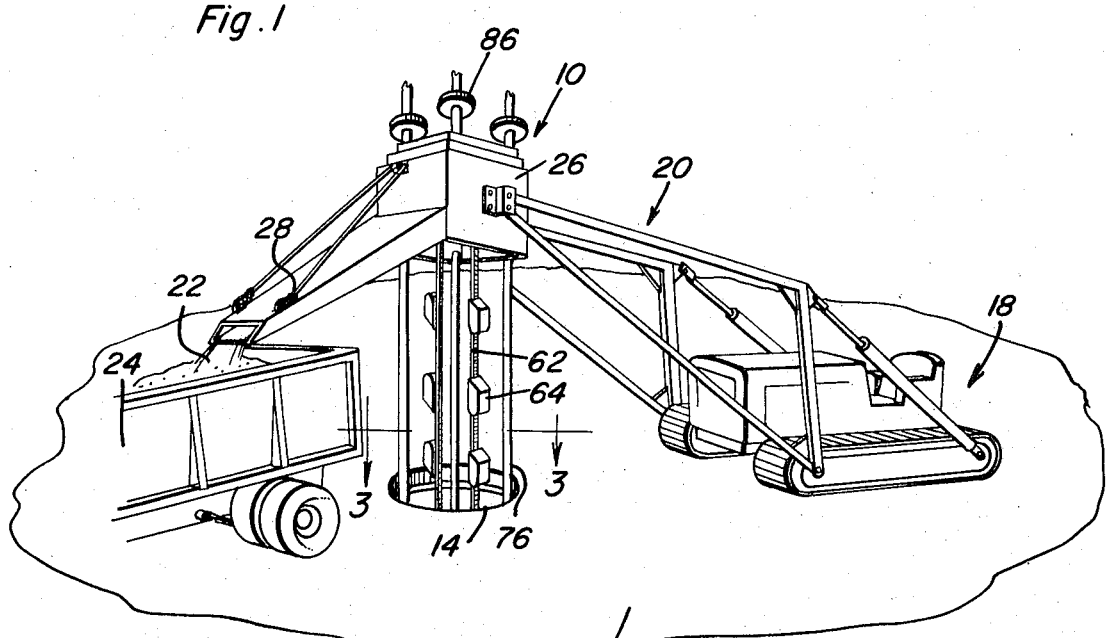
FIG. 1 is a perspective view of the auger drill and conveyor of the present invention.

Referring now specifically to the drawings, the auger drill and conveyor of the present invention is generally designated by the reference numeral 10 and in FIG. 1 is illustrated in use in forming a bore or hole 14 in the ground 16. The auger drill and conveyor 10 may be supported on a suitable vehicle generally designated by the numeral 18 such as a crawler-type tractor or the like with a suitable lifting and lowering frame assembly 20 being provided by which the auger drill and conveyor 10 may be raised and lowered in relation to the bore 14. Also, the material 22 being excavated from the bore 14 may be discharged into a suitable vehicle such as a dump truck 24 or the like so that the material may be disposed of in a well known manner.

Figure 4:
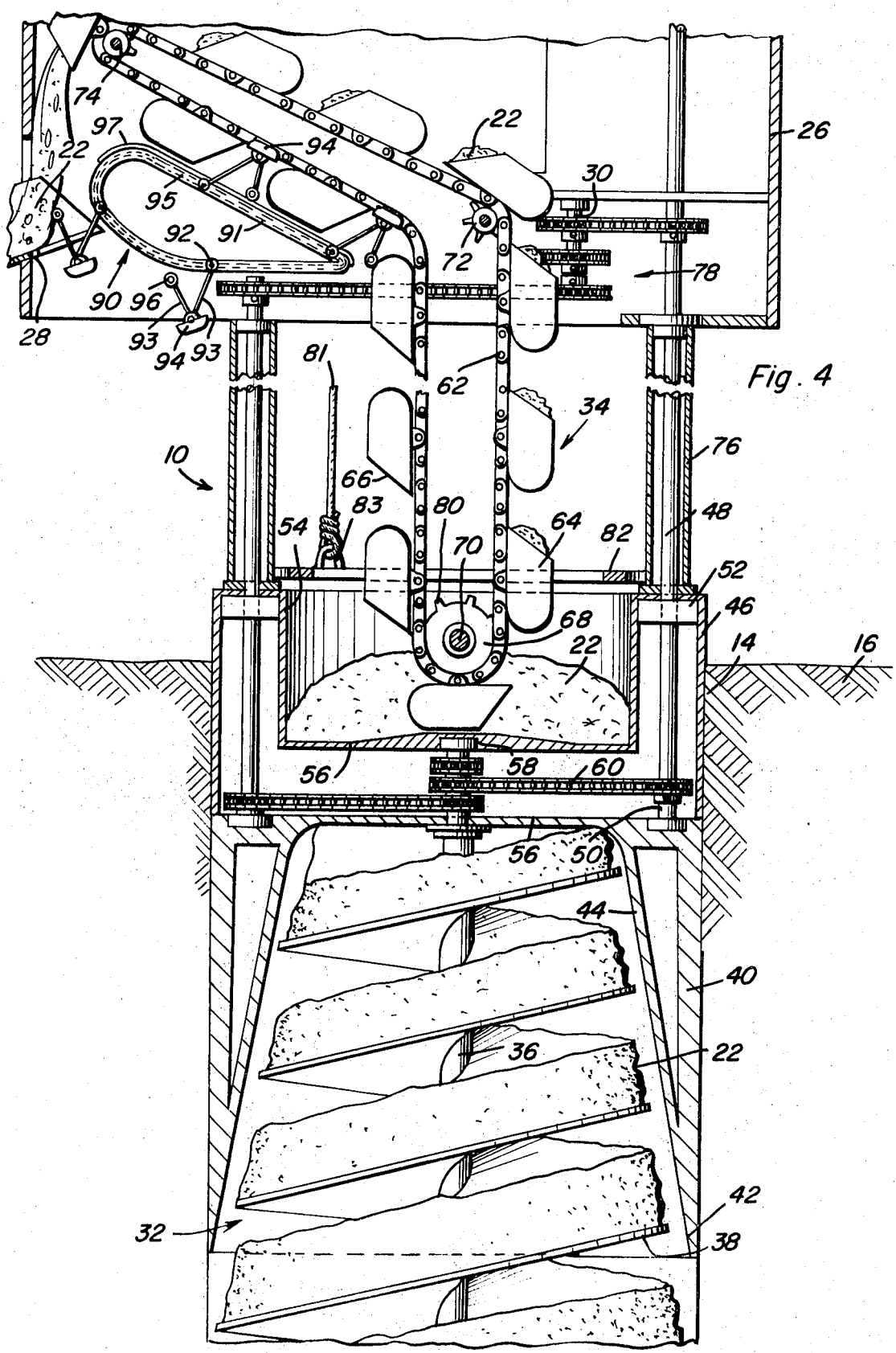
FIG. 4 is a vertical sectional view, on an enlarged scale, taken substantially upon a plane passing along section line 4—4 of FIG. 3 illustrating the specific structural details of the invention.

The upper end portion of the auger drill and conveyor is in the form of an enlarged housing 26 having a chute 28 pivotally connected thereto for discharge of the material 22 laterally of the bore 14. The housing 26 is attached to the supporting framework 20 carried by the vehicle 18 in any suitable manner and includes a self-contained power unit such as an internal combustion engine or the like to provide driving power to the auger drill and conveyor. Such a power unit or engine is schematically illustrated in FIG. 4 with this unit including an output shaft 30 driven at a desired speed for providing power to the components of this invention which basically include an auger drill assembly 32 and a bucket-type elevator or conveyor assembly 34.

The auger drill assembly 32 includes a centrally disposed vertical shaft 36 having a spiral auger flight 38 rigid thereon with the auger flight including several convolutions, the actual number being variable, with the uppermost convolutions being gradually of lesser diameter than the lowermost convolutions thus forming a tapering auger which tapers inwardly towards its upper end.

Surrounding a major portion of the drill auger assembly 32 is a cylindrical member 40 which fits closely into the bore 14 with the lower end thereof being pointed or beveled as at 42 on the inner surface thereof to shape and define the bore 14 as it is being formed. The tapered inner surface 42 continues upwardly into a tapering interior surface 44 which is closely associated with the periphery of the tapering auger flight 38 thus providing an auger conveyor for the material 22 which is being cut and removed by the lowermost convolution of the auger flight which is provided with a suitable cutting edge which may be removable for replacement when desired.

Extending upwardly from the cylindrical shell 40 is a cylindrical housing 46 having a diameter equal to the cylindrical shell 40. Journaled vertically in the housing 46 are three drive shafts 48 which extend vertically throughout the height of the housing and also above the housing with the shafts 48 being journaled in suitable bearings 50 at the lower ends of the shafts and suitable bearings 52 at the upper ends of the housing. As illustrated in FIG. 4, the housing 46 includes an inner cylindrical wall 54 concentric with the housing and defining a recess or receptacle area for receiving the lower end of the bucket conveyor 34. Extending radially inwardly of the bottom of the housing 46 are three tubular members 56 which communicate with each other and the central area of the tubular members 56 receives the upper end of the auger shaft 36 with suitable bearings being provided for the shaft 36 where it intersects both the bottom and the top portion of the intersection area of the tubular members 56 with the upper end of the shaft 36 being journaled in a recess 58 in the top wall of the thickened portion of the intersecting tubular members 56 as illustrated in FIG. 4 so that no dirt 22 will enter the interior of the tubular members. The auger shaft 36 is driven by three sprocket and chain drive assemblies 60 which interconnect the respective drive shafts 48 and the auger shaft 36 with the specific construction of the chains and sprocket gears being conventional in nature in order to provide driving force to the auger drill 32. The three tubular members 56 which are in the form of a spider type construction provide communication between the upper end of the shell 40 and the recess or receptacle defined by the inner wall 54 on the housing 46 so that soil 22 conveyed upwardly by the auger drill will be positioned within the recess or receptacle area defined by the inner wall 54 as illustrated in FIG. 4 so that access may be had thereto by the bucket conveyor 34 in a manner described hereinafter.

The bucket conveyor 34 includes an endless sprocket chain 62 having a plurality of buckets 64 mounted thereon which have a slanted open end 66 and which are attached to the sprocket chain for movement therewith in a well known manner. The lower portion of the sprocket chain 62 is entrained over a sprocket gear 68 supported on a shaft 70 extending transversely of the housing 46 below the top end of the inner wall 54 so that as the sprocket chain 62 passes under the sprocket gear 68, the buckets 64 will pick up soil or material in the recess area or receptacle defined by the wall 54 and move it upwardly in a well known manner. Adjacent the upper end of the conveyor 34, a sprocket gear 72 is provided over which the sprocket chain 62 is entrained so that the upper end portion of the sprocket chain 62 may extend laterally for entrainment around an upper sprocket gear 74 so that as the buckets pass over the upper sprocket gear 74, the buckets will be inverted so that the soil will be dumped vertically from the open end thereof onto the inclined chute 28 for discharge into the vehicle. The return run of the sprocket chain may be either straight or guided by suitable guide means 90. The guide means 90 includes an endless loop track 91 which guidingly receives rollers 92 on the lower end of one of a pair of converging legs 93 which support a saddle 94 at the apex ends. The rollers 92 are interconnected by a flexible chain or cable 95 which retains the saddles 94 properly spaced as they are driven around the track due to their interengagement with the conveyor chain 62. The other of the legs 93 has a roller 96 thereon which engages guide rail 97 along the upper portion of the track 91 but is free to swing away from the track at other times within the limits permitted by chain 95.

While a single chain conveyor and bucket assembly has been illustrated in which the chain is attached to the buckets at the centerline of the buckets, it is pointed out that various types of conveyor arrangements may be employed such as a double chain conveyor in which the chains are along the outer surfaces of the buckets which are disposed therebetween with the essential factor being the use of a bucket-type elevator for scooping up the soil 22 and depositing it onto the discharge chute. Each of the sprocket gears are journaled on a suitable shaft and the uppermost sprocket gear is preferably driven from a suitable power connection with the power source or engine provided for driving the auger as well as the conveyor. Thus, with this construction, the formation of the bore 14 may be continuous inasmuch as the soil being removed by the auger is conveyed to the upper end of the bore and above the upper end of the bore so that the material may be discharged into the vehicle 24.

The drive shafts 48 extend up through vertically oriented tubular members 76 rigid with housing 46 and which form housings for the drive shafts and which may include suitable bearing structures for the shafts. The drive shafts 48 are driven by a drive assembly such as sprocket gear and chain assembly 78 which drive all of the drive shafts from the engine or other power source and the upper ends of the drive shafts 48 extend above the enclosure or housing 26 and receive floating collars 86 thereon. The tubular members 76 and the drive shafts 48 are sectional so that additional length may be provided therefor and, of course, the conveyor 74 is provided with segments which may be introduced as the vertical length of the conveyor increases as the housing 46 and the auger drill 32 lowers itself into the bore 14.

Figure 2:
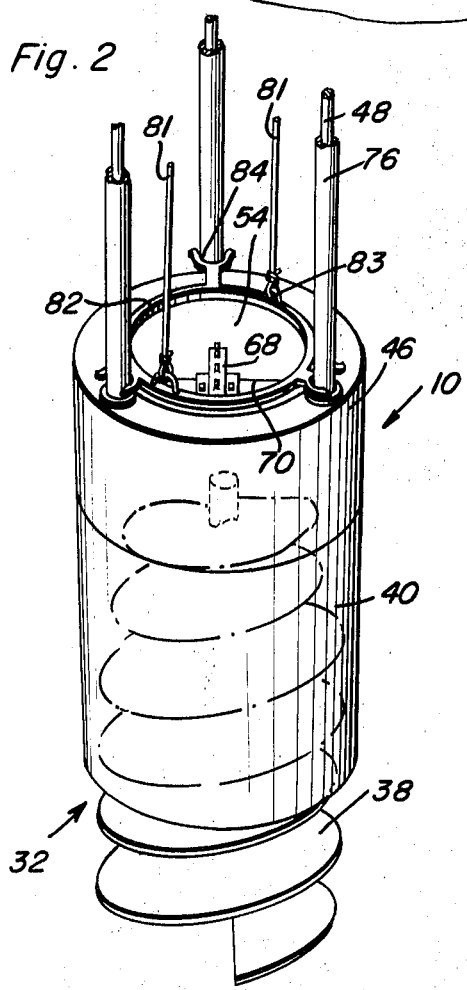
FIG. 2 is a fragmental perspective view of the device.
Figure 3:
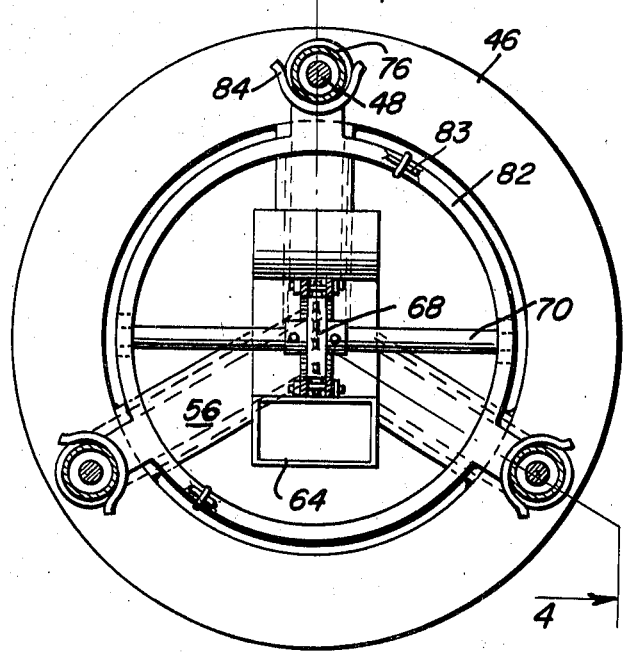
FIG. 3 is a transverse, sectional view taken substantially upon a plane passing along section line 3—3 of FIG. 1, on an enlarged scale, illustrating the orientation of components of the auger drill and conveyor.

As illustrated in FIGS. 2-4, the shaft 70 for the lower sprocket gear 68 is supported from a pair of depending brackets 80 alongside of the wall 54 with the brackets depending from an annular ring 82 having a plurality of U-shaped yokes or saddles 84 thereon which correspond in number with and engage with the tubular members 76 to enable vertical movement of the lower end of the bucket elevator or conveyor 34 with the lowermost position thereof being determined by the saddles 84 coming into contact with the upper end of the housing 46.

With this arrangement, the conveyor 34 may be lifted out of the bore 14 while leaving the auger 32 therein if access is desired to the bore for any reason. Lifting of the conveyor may be accomplished by lifting cables 81 connected to loops or eyes 83 welded or otherwise secured to ring 82 in balanced condition. The cables can also be used to retrieve the auger by lifting it from the bore to enable withdrawal of the auger for inspection, replacement of blades to assist in hole direction correction and to relieve heavy pressure which may be placed on the auger by the weight of the conveyor, drive shafts and the like. The weight of the conveyor will usually retain it in its lowest position and any suitable detachable connection may be provided in the drive shaft assemblies to enable them to be disconnected from their driving source when the conveyor is lifted out of the bore away from the auger drill 32. The yokes 84 holding the lower end of the conveyor in place may be provided with suitable latching devices which will normally latch the conveyor in position but the latches may be activated by reverse drive of the conveyor for a short distance. In other words, reversing of the conveyor for a short distance may release the latches which hold the ring 82 and yokes 84 in position thus enabling the conveyor to be rapidly lifted out without a person having access thereto. This will enable rapid access to any one which may be trapped underground and a rescue bore extended to the entrapment area in which event the auger drill would be left in place at a point below the entrapment area and access then could be had rapidly to the entrapment area by removal of the conveyor with the tubular members 76 which may be left in place serving to also assist in retaining material from falling into the bore.

Floating collars 86 are employed for applying pressure selectively on the different drive shafts to provide directional control for the auger drill. By connecting the floating collars 86 to the shafts 48 and applying downward pressure on one or two of the drive shafts while preventing downward movement of the other drive shaft, the direction of the auger drill may be gradually altered thus enabling lead off bores to be made if necessary.

When using the device of this invention, a bore hole may be continuously formed with the capacity of the conveyor being at least equal to the capacity of the auger drill to cut and remove dirt or soil from the bottom of the bore 14. Directional control to the auger drill and conveyor is accomplished by the collars which may be secured to the drive shafts at any time desired by setscrews of the like and vertical forces then applied to the drive shafts by any suitable means such as by adding weight thereto above the floating collar that is secured to the shaft. The specific construction of the conveyor may be altered with the lower end of the conveyor being supported by the annular ring and releasably latched in position by a latch mechanism that may be automatically released upon reversal of the conveyor. Thus, by reversing the conveyor or by any other suitable means, the latch mechanism may be released thus enabling the conveyor to be lifted out of the bore and separated from the auger drill and the drive shafts which will be left in the bore in order to stabilize the interior wall of the bore thereby facilitating use of the device in rescuing persons entrapped below ground by boring a hole to a point slightly below the entrapment area and then removing the conveyor to provide rapid access to the entrapment area. The drive shafts and associated structure are driven in a conventional manner and are segmental to enable effective elongation thereof and the conveyor also is constructed so that the effective length thereof may be varied as the depth of the bore increases.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An apparatus for forming a bore into the earth's surface comprising an auger drill including a spiral auger for orientation in a vertical position, a conveyor at the upper end of the spiral auger in the form of an endless member having buckets thereon movable in a manner to pick up material discharged at the upper end of the spiral auger, a substantially cylindrical shell enclosing the upper portion of the spiral auger, a housing on the upper end of the shell extending peripherally of the lower end of the conveyor for forming a receptacle area for material discharged by the spiral auger and retaining such material in position for pick up by the conveyor thereby enabling the continuous formation of the bore without removing the spiral auger from the bore for removing soil from the spiral auger.

2. The structure as defined in claim 1 wherein said spiral auger is tapered upwardly and inwardly, said shell including an upwardly and inwardly tapering interior wall conforming generally with the periphery of the spiral auger to retain soil in the spiral auger for elevating the soil to the upper end of the auger.

3. The structure as defined in claim 2 wherein said housing on the upper end of the shell includes an annular closed space, a plurality of radially extending tubular arms extending from the enclosed space to the center of the housing, said spiral auger including a center shaft having the upper end received in the space defined by the intersection of the tubular arms on the housing, and means driving the auger including a drive assembly extending from the annular space through each of the tubular arms for driving engagement with the center shaft, each driving assembly including an elongated drive shaft extending into the space and vertically thereabove.

4. The structure as defined in claim 3 wherein said conveyor includes a supporting ring resting against the upper end of the housing and supportingly engaging the lower end of the conveyor for retaining it within the interior of the housing above the tubular arms for picking up soil conveyed above the tubular arms by the spiral auger thereby enabling the conveyor to be lifted out of association with the housing and spiral auger.

5. The structure as defined in claim 4 together with collar means on each drive shaft by which vertical forces may be imparted selectively to the drive shafts to provide directional control for the spiral suger.

6. The structure as defined in claim 5 wherein said conveyor includes a chain type assembly having a plurality of buckets thereon, a chute adjacent the upper end of the conveyor for receiving material dumped from the buckets, drive means for the conveyor, power means for driving the conveyor and auger drill, a housing assembly for the power means and drive means, said housing assembly adapted to be supported from a vehicle for moving the apparatus to a desired location with the chute adapted to discharge material onto a load carrying body of a vehicle.

7. A combined auger drill and elevating conveyor for forming a bore into the surface of the earth comprising vertically oriented and aligned spiral auger and conveyor whereby the spiral auger will excavate soil and the conveyor will discharge the material excavated by the spiral auger, said auger including a center shaft having a spiral auger flight thereon with the upper convolutions thereof tapering inwardly with a gradual reduction in radius, a shell encompassing the upper portion of the spiral auger and including a cylindrical external surface for shaping and forming the bore being formed and an inwardly and upwardly tapering interior surface conforming with the periphery of the flight with the relationship between the flight and the interior surface of the shell assuring upward movement of the soil being excavated, said conveyor including a lower end portion and pickup members for passage adjacent the upper end of the auger for picking up soil from the upper end portion thereof and conveying it upwardly and laterally of the bore for discharge at a desired location, the center shaft of the auger being journaled in the center of the shell by radially extending hollow arms, drive means for the auger extending through said arms for driving the center shaft of the auger.

8. The structure as defined in claim 7 wherein the upper end portion of said shell is in the form of a hollow housing defining an annular enclosed space communicating with the arms and a hollow central area open to the upper end of the shell with the hollow central area defining a receptacle for soil conveyed by the auger upwardly and forming a pickup area for the lower end of the conveyor, the drive means for said auger being disposed in the closed annular space in the housing and extending upwardly therefrom to enable effective length of the drive means to be varied as the auger drill and conveyor is lowered into the bore.

* * * * *